United States Patent
Kramer et al.

(10) Patent No.: US 6,264,370 B1
(45) Date of Patent: Jul. 24, 2001

(54) ISOLATED BEARING

(75) Inventors: Dennis A. Kramer, Troy; Dale Bell, Ortonville; Ronald N. Brissette, Lake Orion; Christopher S. Keeney, Troy; Brian J. Mueller, Lake Orion, all of MI (US); Jack R. McKenzie, Hendersonville, NC (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/366,794

(22) Filed: Aug. 4, 1999

(51) Int. Cl.$^7$ ...................................................... F16C 27/06
(52) U.S. Cl. .............................................................. 384/536
(58) Field of Search .................................... 384/536, 535, 384/581, 582; 74/606 R, 417

(56) References Cited

U.S. PATENT DOCUMENTS

| | | | |
|---|---|---|---|
| 3,093,427 | * 6/1963 | Vasta | 384/536 |
| 3,528,712 | * 9/1970 | Vacca et al. | 384/536 |
| 3,554,619 | * 1/1971 | Irwin | 384/536 |
| 3,672,734 | * 6/1972 | Bando | 384/536 |
| 4,229,055 | * 10/1980 | Olschewski et al. | 384/536 |
| 5,033,875 | * 7/1991 | Moulinet | 384/536 |
| 5,044,784 | * 9/1991 | Lisowsky | 384/536 |
| 5,062,721 | * 11/1991 | Chiba | 384/536 |
| 5,316,274 | 5/1994 | Rudolph | 267/140.12 |
| 5,359,842 | 11/1994 | Braxmeier et al. | 57/132 |
| 5,781,373 | 7/1998 | Larson et al. | 360/97.02 |
| 5,816,712 | * 10/1998 | Brown et al. | 384/536 |
| 5,902,050 | 5/1999 | Balczun et al. | 384/206 |

* cited by examiner

Primary Examiner—Thomas R. Hannon
(74) Attorney, Agent, or Firm—Carlson Gaskey & Olds, P.C.

(57) ABSTRACT

An isolator to prevent transmitted vibrations includes a ring which fits within a shaft opening of a housing. A bearing is received within the isolator and a shaft is received within the bearing. The vibrations are decoupled from a vibration transmission path by the different material of the isolator. The isolator is preferably manufactured of a rigid laminate material dissimilar to the housing material. Another embodiment of the present invention integrates the isolator directly into the bearing assembly. By manufacturing the outer member of the bearing assembly of the laminated material, the outer member similarly breaks the transmission path of vibrations without the need of the additional member. Noise is thereby substantially prevented from reaching, and from being amplified by, the housing. This greatly reduces the resulting noise and vibration.

13 Claims, 1 Drawing Sheet

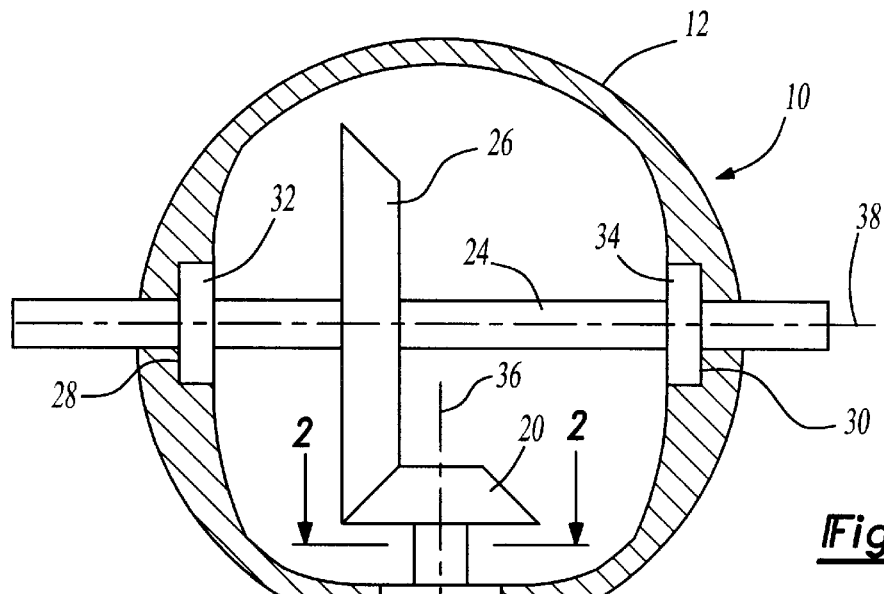
*Fig-1*
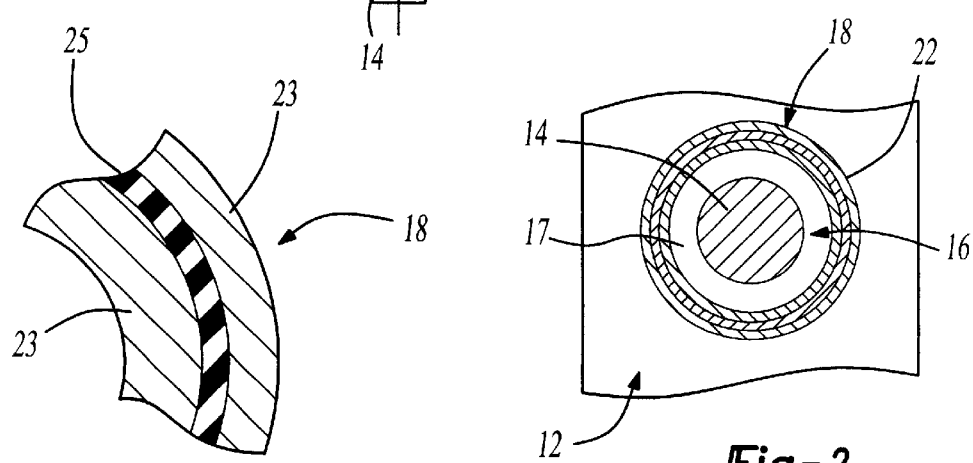
*Fig-3*
*Fig-2*
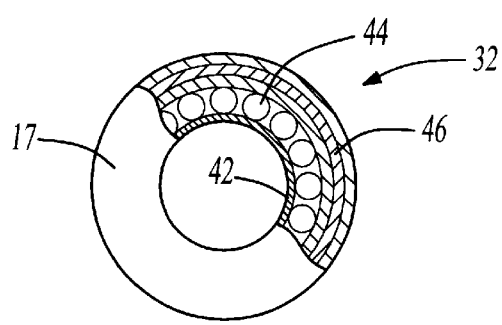
*Fig-4*

ISOLATED BEARING

BACKGROUND OF THE INVENTION

The present invention relates to a bearing, and more particularly to isolating a bearing to prevent transmitted vibrations.

A gearbox or housing provides a mounting point for multiple shaft mounted intermeshing gears. Each shaft is typically mounted through the housing and retained at one or both ends by a bearing. The bearings are fitted into an opening in the housing and supports an end of the shaft. The shaft is rigidly mounted to maintain the shafts rotational centerlines which allows the shaft and gears to rotate at high speed within the housing.

As the shafts are rotated at high speed, any minor variations in the intermeshing gear teeth create vibration. Some of this vibration takes the form of sound energy, i.e. noise, which travels along a transmission path. The vibrations are transmitted along the transmission path through the mounted shaft, into the bearings, and into the housing. The vibration is further amplified by the housing and radiated to the environment. This noise and vibration is both undesirable and can be subject to regulatory rules.

It is known to manufacture the gear teeth to very tight tolerances in an attempt to minimize vibrations. It is further known to dampen the vibrations with elastomeric bearings. However, the former reaches the limits of a machining process and the later can interfere with maintaining the rotational centerlines of the shafts.

Accordingly, it is desirable to break the transmission path to reduce the transmitted noise while maintaining a rigid structure for supporting the high speed rotation of the gear shafts.

SUMMARY OF THE INVENTION

An isolator according to the present invention breaks the transmission path of noise and vibration while maintaining a rigid structure to support the high speed rotation of a shaft.

The isolator is preferably manufactured as a ring which fits within an opening of a housing. The bearing is inserted into the isolator with the isolator being sandwiched between the bearing and the housing. The shafts can thus be rotated at high speed as the shaft centerlines and resulting gear alignment is maintained by the isolator's rigid mounting of the bearing.

The isolator is preferably manufactured from a material different than the housing material. The preferred material for the isolator being a laminate such as two sheets of metallic material having a non-metallic material sandwiched therebetween. The dissimilar materials of the laminate breaks the vibration transmission path. Transmission of vibrations through the rotating shaft is decoupled from their transmission path by the dissimilar materials of the isolator. Further, as the isolator and housing materials are different. The vibration path is also disrupted. Accordingly, noise is substantially prevented from reaching and being amplified by the housing. This substantially reduces the resulting noise and vibration radiated to the environment.

Another embodiment of the present invention provides a bearing assembly having a noise isolating outer member. By manufacturing the outer member of a laminate, or other rigid vibration isolating material, the outer member itself breaks the transmission path of vibrations. The outer member therefore integrates the isolator as described above directly into the bearing assembly simplifying assembly and reducing cost.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is a sectional view of a gear housing assembly according to the present invention;

FIG. 2 is a sectional view taken along the line 2—2 of FIG. 1 illustrating a housing opening lined with an isolator and a bearing fitted within the isolator;

FIG. 3 shows a portion of an isolator according to the present invention; and

FIG. 4 is a partial sectional view of a bearing assembly illustrating a bearing having an isolator cage according to the present invention.

DETAILED DESCRIPTION OF THE PREFERRED EMBODIMENT

FIG. 1 illustrates a sectional view of a simple gear housing assembly 10. The assembly 10 generally includes a housing 12, a shaft 14, a bearing 16 and an isolator 18.

As shown in FIG. 1, the housing 12 provides a mounting point for multiple shaft mounted intermeshing gears. The housing 12 is typically manufactured of a cast metal having machined openings or bores. Although a generic housing is shown, it is to be understood that the present invention is equally applicable to any gear housing and bearing assembly.

A shaft 14 having a pinion gear 20 passes through the housing 12 at an opening 22. The opening 22 receives a bearing 16 to support the shaft 14 for rotation. A shaft 24 passes through the housing 12 to support a ring gear 26 which engages the pinion gear 20. The horizontal shaft 24 passes through the housing 12 at openings 28 and 30 which receive bearings 32 and 34. The bearings 32,34 are fitted in the openings 28,30 to support the shaft 24 for rotation. The shafts 14,24 are thereby rigidly mounted to maintain shaft rotational centerlines 36 and 38, respectively. The rotational centerlines 36,38 must be maintained to provide continued alignment of gears 20,26.

The invention minimizes the noise radiating from the intermeshed gears 20,26 by interposing a dissimilar material between the housing and the rotating shafts. Isolator 18 is preferably manufactured of a rigid material to maintain the rotational centerlines 36,38 of the shafts 14,24. The shafts 14, 24 can thus be rotated at high speed as the alignment of gears 20,26 is maintained by the rigid mounting of the bearings.

Referring to FIG. 2, a section view taken along the line 2—2 of FIG. 1 illustrates one of the isolator 18 lined housing openings 22. Although a single opening 22 is shown, it should be realized that each of the openings would benefit from the present invention. Also other housings which mount shafts driving engaged gears would benefit from this invention.

The opening 22 is preferably lined with the isolator 18 and the bearing 16 fitted within the isolator 18. As known, bearing 16 preferably has an inner race, an outer race and intermediate bearing elements contained within a bearing housing 17 (also illustrated in FIG. 4). A material dissimilar than the housing 12 is preferred for the isolator 18. The dissimilar material is selected to have properties that break or decouple the noise transmission path. Further, as the isolator 18 and housing 12 materials are different, the vibration path is further disrupted. The isolator 18 receives the bearing 16 to separate the rotating shaft 14 from the housing 12. Preferably, the isolator 18 is press fitted within the opening 22 with the isolator 18 sandwiched between the bearing 16 and the cast housing 12. Alternative mechanical mountings can be likewise applied.

Commonly, bearings are fitted directly into the housing. Any housing can thereby be retrofitted to incorporate the present invention by increasing the diameter of the machined opening in the housing to compensate for the isolator's diameter. The isolator 18 is fitted into the enlarged housing opening 22 which returns the enlarged opening to it's previous diameter. The enlarged opening 22 and isolator 18 receive the identical bearing 16 and shaft 14 arrangement previously located directly into the housing 12. No modification to the bearing and shaft components is required to take advantage of the present invention.

As shown in FIG. 3, the isolator 18 is preferably tubular in cross-section and manufactured of a laminate. The laminate can be two layers of metallic material 23 having a non-metallic material 25 sandwiched therebetween. The non-metallic material provides good sound absorption while the layers 23 insure an acceptable mount. An example of such a laminate is the laminated steel known by the trade name CQ and produced by Trelleborg Automotive of South Haven, Mich.

The isolator 18 breaks the transmission path of vibrations emanating from the gears 20,26. As the vibrations are decoupled by the isolator 18, noise is substantially prevented from reaching, and thereby being amplified by, the housing 12. This greatly reduces the resulting radiation of noise and vibration to the surrounding environment.

Referring to FIG. 4, another embodiment of the present invention illustrates a section view of the bearing assembly 32. The bearing assembly 32 includes an inner race 42, a central bearing members 44 and an outer race 46 or cage. The inner race is fitted to the shaft 32 (FIG. 1) and rotates within the central members 44. The outer race 46 is rotatably mounted about the central members 44. It is to be understood that the term central bearing members 44 as used herein is not intended to be construed narrowly and should be taken to include roller bearings, ball bearings, pin bearings and the like. It is to be further understood that other types of bearing assemblies would likewise benefit from the present invention.

Preferably, the outer race 46 is manufactured of the laminate material described above. The outer race 46 therefore integrates the isolator as described above directly into the bearing assembly 32. By manufacturing the outer race 46 of the laminate, the outer race 46 of the bearing assembly 32 is the isolator. The bearing assembly 32 thereby breaks the transmission of vibration from the shaft and gears. The additional separate isolator ring described above being eliminated.

The present invention therefore provides an isolator that breaks the transmission path of vibration to reduce the transmitted noise while maintaining a rigid structure to support high speed rotation of the gear shafts.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A gear housing assembly comprising:
   at least one shaft driving a gear;
   a housing mounting at least one end of said shaft;
   at least one bearing mounting said shaft in said housing; and,
   said at least one bearing having an inner race, and a central bearing member mounted adjacent said inner race;
   an outer race rotatably mounted about said central bearing member; and
   a rigid isolator positioned between said housing and said outer race, said isolator being generally cylindrical and surrounding said outer race.

2. The housing assembly as recited in claim 1, wherein said isolator is a laminate.

3. The housing assembly as recited in claim 2, wherein said isolator is a laminated steel.

4. The housing assembly as recited in claim 2, wherein said isolator includes a first and a second metallic material having a non-metallic material sandwiched therebetween.

5. The housing assembly as recited in claim 1, wherein said isolator is said outer race.

6. A housing assembly comprising:
   a housing manufactured of a first material;
   a rigid isolator manufactured of a second material, said isolator received within an opening in said housing;
   a bearing including said rigid isolator as an outer race of said bearing; and
   a shaft rotatably supported by said bearing for driving a gear.

7. The housing as recited in claim 6, wherein said isolator has a substantially tubular cross-section.

8. The housing as recited in claim 6, wherein said second material is a laminate.

9. The housing as recited in claim 6, wherein said second material is a laminated steel.

10. The housing assembly as recited in claim 6, wherein said isolator material includes a first and a second metallic material having a non-metallic material sandwiched therebetween.

11. The housing as recited in claim 6, further comprising a plurality of shafts rotatably supported within said housing, each of said shafts supported by at least one bearing, each of said bearings received within an isolator manufactured of said second material, said shafts driving intermeshing gears to transmit rotation.

12. A housing assembly comprising:
   a housing manufactured of a first material;
   a plurality of bearing assemblies each having an inner race, an outer race and a central bearing member therebetween, said outer race manufactured of a second laminate material and received within an opening in said housing; and
   a plurality of shafts, each of said shaft rotatably supported by at least one of said bearings in said inner member and driving gears, said gears of said shaft intermeshing to transmit rotation.

13. A gear housing assembly comprising:
   at least one shaft driving a gear;
   a housing mounting at least one end of said shaft;
   at least one bearing mounting said shaft in said housing; and,
   said at least one bearing having an inner race, and a central bearing member mounted adjacent said inner race;
   an outer race rotatably mounted about said central bearing member, said outer race manufactured of an isolator material, said outer race positioned between said housing and said outer race.

* * * * *